(12) United States Patent
Kanazawa et al.

(10) Patent No.: US 7,642,452 B2
(45) Date of Patent: *Jan. 5, 2010

(54) ELECTRIC JUNCTION BOX

(75) Inventors: Masashi Kanazawa, Yokkaichi (JP); Eiji Higuchi, Yokkaichi (JP); Yoshihisa Shimada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 329 days.

This patent is subject to a terminal disclaimer.

(21) Appl. No.: 11/493,607

(22) Filed: Jul. 27, 2006

(65) Prior Publication Data

US 2006/0260834 A1   Nov. 23, 2006

(51) Int. Cl.
*H02G 3/08* (2006.01)

(52) U.S. Cl. ............... 174/50; 174/520; 174/60; 174/59; 439/76.1; 439/76.2

(58) Field of Classification Search ............ 174/50, 174/17 R, 520, 17 VA, 60, 17 CT, 59, 61, 174/58; 439/949, 76.1, 76.2, 535, 724, 723, 439/212; 220/3.2, 3.3, 3.8, 3.9, 4.02; 361/600, 361/601

See application file for complete search history.

(56) References Cited

U.S. PATENT DOCUMENTS

| | | | | |
|---|---|---|---|---|
| 5,427,261 A | * | 6/1995 | Naitou | 220/3.8 |
| 5,435,453 A | * | 7/1995 | Higuchi | 220/3.8 |
| 5,531,345 A | * | 7/1996 | Nakamura et al. | 220/3.8 |
| 5,967,819 A | | 10/1999 | Okada | |
| 6,309,225 B2 | * | 10/2001 | Kameyama | 439/76.1 |
| 6,545,217 B2 | * | 4/2003 | Sato | 174/50 |
| 6,629,619 B2 | * | 10/2003 | Sato et al. | 220/4.02 |
| 6,768,054 B2 | * | 7/2004 | Sato et al. | 174/50 |
| 6,787,698 B2 | * | 9/2004 | Higuchi et al. | 174/50 |
| 6,977,340 B2 | * | 12/2005 | Nakamrura | 174/667 |
| 7,017,764 B2 | * | 3/2006 | Okada | 220/3.2 |
| 7,129,410 B2 | * | 10/2006 | Kanazawa | 174/50 |
| 7,179,990 B2 | * | 2/2007 | Kanazawa | 174/50 |

FOREIGN PATENT DOCUMENTS

| | | |
|---|---|---|
| JP | A-09-308053 | 11/1997 |
| JP | A 2000-211666 | 8/2000 |
| JP | A 2001-112145 | 4/2001 |

* cited by examiner

*Primary Examiner*—Angel R Estrada
(74) *Attorney, Agent, or Firm*—Oliff & Berridge, PLC

(57) ABSTRACT

An electric junction box is disposed in a water penetration region and accommodates bus bars and fuses connected with the bus bars inside a case body. The case body is connected with an upper cover and a lower cover, with the upper cover and the lower cover mounted on the case body. An entire peripheral wall of the upper cover is formed not as a double wall, but the entire peripheral wall of the upper cover is locked to a peripheral wall of the lower cover (or case body), with an inner peripheral surface of the peripheral wall in contact with an outer surface of an entire peripheral wall of the lower cover (or case body). In a watertight region including at least the fuses, a rib is projected in a shape of a frame from an inner surface of the upper wall of the upper cover to surround the watertight region.

15 Claims, 9 Drawing Sheets

ELECTRIC JUNCTION BOX

BACKGROUND

The present invention relates to an electric junction box. More particularly, the present invention relates to an electric junction box whose watertight construction is improved, and which may be made compact.

As an example of a conventional watertight construction mounted on, for example, a car, the construction disclosed in Japanese Patent Application Laid-Open No. 9-308053 (JP-A-09-308053) is described below. Describing the watertight construction in detail, as shown in FIG. 13, the watertight construction includes a case body 2 where bus bars 6, fuses 7, and the like are mounted; an upper cover 3 placed on the upper surface of the case body 2; and a lower cover 4 placed on the lower surface of the case body 2. The case body 2 and the upper cover 3 are connected to each other with a locking portion 5a. The case body 2 and the lower cover 4 are connected to each other with the locking portion 5b. In an electric junction box 1 having the above-described construction, a rib 3b is provided on the inner side of the upper cover 3 along the entire peripheral wall 3a thereof to form a double wall, and the peripheral wall 2a of the case body 2 is fitted between the entire peripheral wall 3a and the rib 3b. Thereby the entire electric junction box 1 is formed having a watertight construction.

SUMMARY

However, in the above-described watertight construction, because the double wall construction is formed along the entire peripheral wall 3a of the upper cover 3, a large space is required to form the rib 3b. Therefore, the electric junction box 1 has a large outer configuration, which is contradictory to demand for miniaturization of the electric junction box and which further limits the layout or installation of the junction box. Further, because the entire electric junction box 1 is formed having a watertight construction in the peripheral surface thereof, the watertight performance may be affected by the configuration of the electric junction box 1. When one side of the electric junction box is long, the peripheral wall of the long side and the rib may deform relatively easily owing to warp and sink marks. Thus it may be difficult to realize constant watertight performance. It may also be difficult to realize good watertight performance in specific regions inside the electric junction box.

The present invention has been made in view of the above-described problems. Accordingly, it is an object of the present invention to provide an electric junction box which satisfies a demand for miniaturization and has stable and high watertight performance.

To achieve the object, embodiments of the present invention provide an electric junction box which may be disposed in a water penetration region and may accommodate bus bars and fuses connected with the bus bars inside a case body, the case body being connected with an upper cover and a lower cover, with the upper cover and the lower cover mounted on the case body. In these embodiments, the entire peripheral wall of the upper cover is formed not as a double wall but the entire peripheral wall of the upper cover is locked to a peripheral wall of the lower cover or that of the case body. In a watertight region including at least the fuses, a rib is projected in a shape of a frame from an inner surface of an upper wall of the upper cover to surround the watertight region.

To prevent the fuses from corroding over time, it is generally necessary to waterproof the fuse area to a greater extent than other areas inside the electric junction box. It also is favorable that other portions of the electric junction box are not exposed to water, although this is not a serious problem so long as the electric junction box may be constantly drained. Therefore the entire electric junction box does not necessarily have to be provided with a waterproof construction, although in such cases it is necessary to form the rib in, and only in, the watertight region including the fuse. Unlike the conventional construction in which the rib is formed along the entire peripheral wall of the upper cover, the embodiments of the present invention allow the space for the rib to be reduced. Consequently it is possible to effectively utilize a wide space inside the electric junction box as a space for wiring the bus bar, for example, and hence make the electric junction box compact.

By forming the rib for watertight use on the periphery of the watertight region, the watertight performance of the rib is not affected adversely by the configuration of the entire electric junction box. Thus the watertight region has constant and effective watertight performance.

The bus bars connected with the fuses disposed in the watertight region surrounded with the rib are disposed in the case body and a watertight bent portion which rides across the rib is formed by bending the bus bars.

Other embodiments of the present invention provide an electric junction box which may be disposed in a water penetration region and may accommodate bus bars and fuses connected with the bus bars inside a case body of the electric junction box, the case body being connected with an upper cover and a lower cover, with the upper cover and the lower cover mounted on the case body. In these embodiments, a rib is projected from an inner surface of an upper wall of the upper cover disposed in a watertight region including at least the fuses, with the rib disposed in proximity to and in confrontation with a peripheral wall of the upper cover; and a peripheral wall of the lower cover or that of the case body is fitted in a gap between the rib and the peripheral wall of the upper cover to form a waterproof wall. Inside a region of the upper cover in which the waterproof wall is not provided, watertight bent portions are formed by bending the bus bars connected with the fuses, and the watertight region collectively surrounded by the watertight bent portions and the waterproof wall.

More specifically, in the peripheral portion surrounding the watertight region including at least a fuse, the rib is projected from the inner surface of the upper wall of the upper cover, but only in a portion of the periphery of the watertight region disposed between the peripheral wall of the upper cover and the watertight region. This arrangement does not require a wide space in a horizontal direction, even though electrical members (for example, vertically disposed bus bars) are disposed. The rib is spaced at a required interval from the peripheral wall of the upper cover so that the lower cover or the peripheral wall of the case body can be fitted in the space. When the upper cover and the lower cover are connected to the case body, with the upper cover and the lower cover placed on the upper and lower surfaces of the case body, respectively, the lower cover or the peripheral wall of the case body is fitted between the peripheral wall of the upper cover and the rib to form the waterproof wall.

In a portion of the periphery of the watertight region disposed inside the upper cover, which is distant from the peripheral wall of the upper cover and includes a member such as the bus bar between the peripheral wall of the upper cover and the watertight region, it is impractical to form a waterproof wall in which the lower cover or the peripheral wall of the case body is fitted between the peripheral wall of the upper cover and the rib. Therefore in the outer portion of the watertight region, the rib is not formed, but instead the wall-shaped watertight bent portion formed by bending the bus bar is disposed.

The watertight region is surrounded by not only the rib projected from the upper cover, but also the watertight bent portion formed by bending the bus bar. Thereby it is possible to further reduce the rib-forming space and make the electric junction box more compact.

The watertight bent portions of the bus bars may be formed as convex portions projected toward an inner surface of an upper wall of the upper cover. In exemplary embodiments of the invention, a double wall composed of a first small rib and a second small rib projects from the inner surface of the upper wall of the upper cover toward upper surfaces of the projected watertight bent portions. The height of the first small rib disposed in the watertight region is greater than the height of the second small rib disposed in the nonwatertight region. The first small rib contacts the upper surface of the watertight bent portions so that a slight gap is formed between the second small rib and the upper surfaces of the watertight bent portions of the bus bars.

As described above, the first small rib and the second small rib each having different heights, are projected from the inner surface of the upper wall of the upper cover toward the upper surface of the projected watertight bent portion. The second small rib disposed in the nonwatertight region limits penetration of water into the watertight region. Thereafter the first small rib disposed in the watertight region is capable of accomplishing complete watertightness.

The electric junction box may be composed of a fuse box which may be mounted on a battery box. Each of the fuses comprises a fusible link. A watertight region in which one of the fusible links or a plurality of the fusible links is disposed is the watertight region. The bus bars, which may be connected with input terminals of the fusible links, may also be connected with a battery terminal.

Bolts may project from portions where the bus bars and the fusible links are connected with each other and may be vertically spaced at a predetermined gap from a bottom wall of the case body. The bolts may be respectively inserted into input and output terminals of the fusible links to fix the fusible links thereto and may be fastened with nuts. The fusible links also may be spaced at a predetermined gap from the bottom wall of the case body. A drain hole may be formed through the bottom wall of the case body disposed below the fusible links.

In embodiments of the invention where the fusible links and the bus bars connected therewith are disposed with a space formed between them and the bottom wall of the case body, it is possible to efficiently drain water from the drain hole even when the water penetrates into the fuse box, preventing the fusible links and the bus bars from being continuously exposed to the water. Further, in embodiments of the invention in which the fuse box is mounted on the battery box, water penetration into the fuse box from the drain hole should be limited.

As apparent from the foregoing description, according to embodiments of the present invention, compared with the construction in which the rib is formed along the entire peripheral wall of the upper cover, the frame-shaped rib is formed on the periphery of a watertight region. Therefore the space in which the rib is formed is generally smaller than when formed along the entire peripheral wall. The space provided by reducing the rib-forming space can be utilized to wire the bus bar or introduce other components. The electric junction box thus can be made more compact. Also, instead of a part of the rib, a portion of the watertight region may be surrounded with a watertight bent portion of the bus bars formed by bending the bus bars. Therefore it is possible to reduce the total amount of the rib-forming space.

Because the rib is formed on the periphery of the watertight region, the watertight performance of the rib is not affected adversely by the configuration of the entire electric junction box. Thus the watertight region has constant and reliable watertight performance.

The above-described first small rib and second small rib, when used, project from the inner surface of the upper wall of the upper cover to help prevent the penetration of water into the watertight region.

These and other objects, advantages and features are described in or apparent from the following detailed description.

BRIEF DESCRIPTION OF THE DRAWINGS

Exemplary embodiments will be described in connection with the attached drawings, in which like numerals represent like parts, and in which.

DETAILED DESCRIPTION OF EMBODIMENTS

Figure 1:
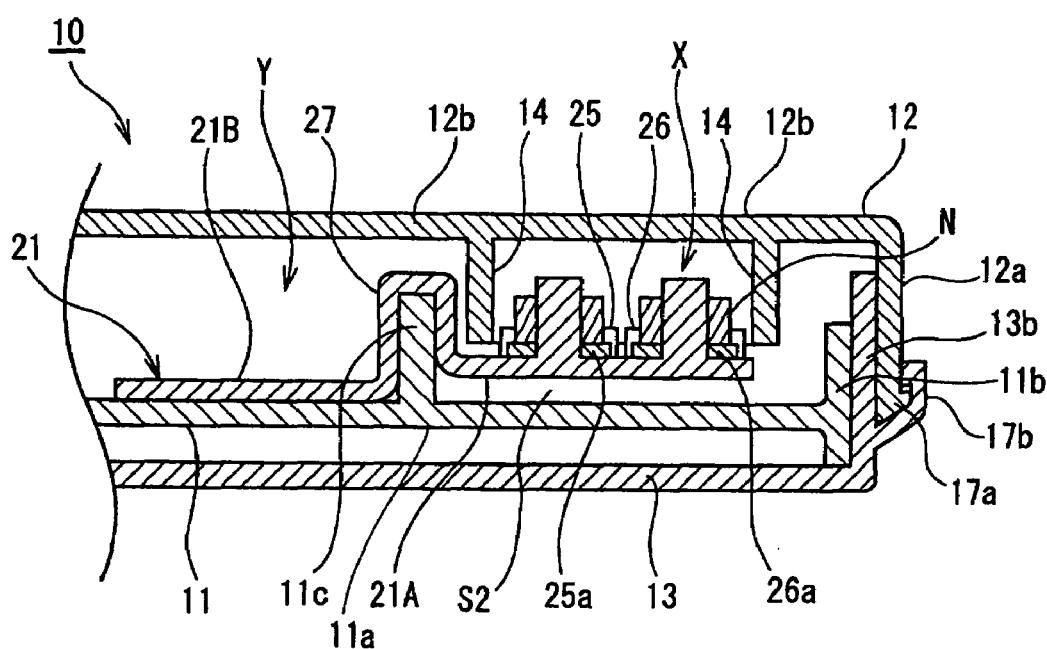
FIG. 1 is a sectional view showing an electric junction box according to a first embodiment of the present invention.

Embodiments of the present invention will be described below with reference to the drawings. In any of the embodiments described below, the present invention applies to an electric junction box including a fuse box disposed in a water penetration region, which region may, for example, be in the area of an engine compartment of a vehicle.

FIGS. 1 through 6 show an electric junction box of a first embodiment of the present invention. A case body 11 of the electric junction box 10 has a plurality of bus bars 21, 22, 23 (see FIG. 2) and fusible links 25, 26 connected with the bus bars 21, 22, 23. The case body 11 may be placed on a battery box 40, with the upper cover 12 and the lower cover 13 coupled thereto.

Figure 2:
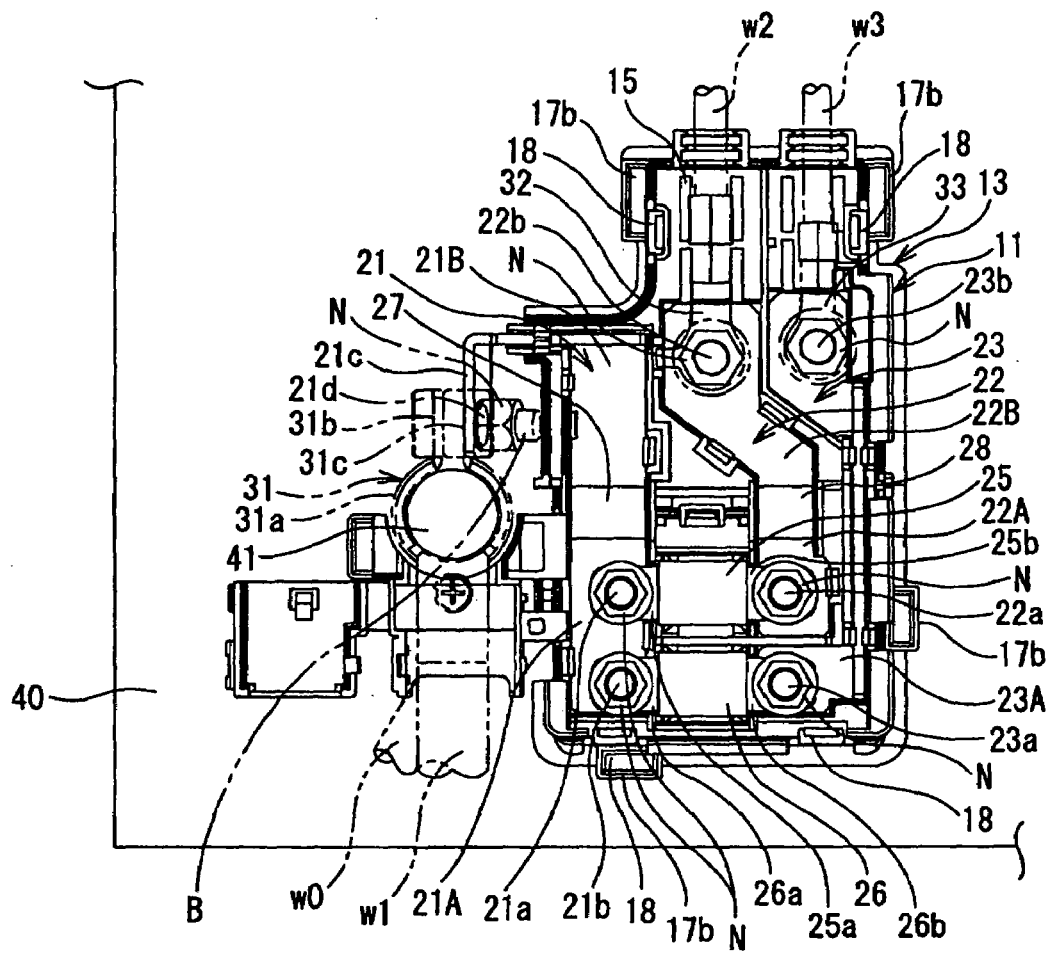
FIG. 2 is a plan view showing the inside of the electric junction box shown in FIG. 1.

More specifically, as shown in FIG. 2, one input-side bus bar 21 and two output-side bus bar 22, 23 may be disposed on an upper surface of the case body 11. Bolts 21a and 21b projected from one side of the input-side bus bar 21 may be fitted to an input terminal 25a of the fusible link 25 and to an input terminal 26a of the fusible link 26, respectively, to fasten the input terminals 25a and 26a to the input-side bus bar 21 with bolts 21a and 21b and nuts N. A bolt 22a projected from one side of the output-side bus bar 22 may be fitted to an output terminal 25b of the fusible link 25, and a bolt 23a projected from one side of the output-side bus bar 23 may be fitted to an output terminal 26b of the fusible link 26 to fasten the output terminals 25b and 26b to the output-side bus bars 22 and 23, respectively, with the bolts 22a and 23a and the nuts N.

Figure 5A:
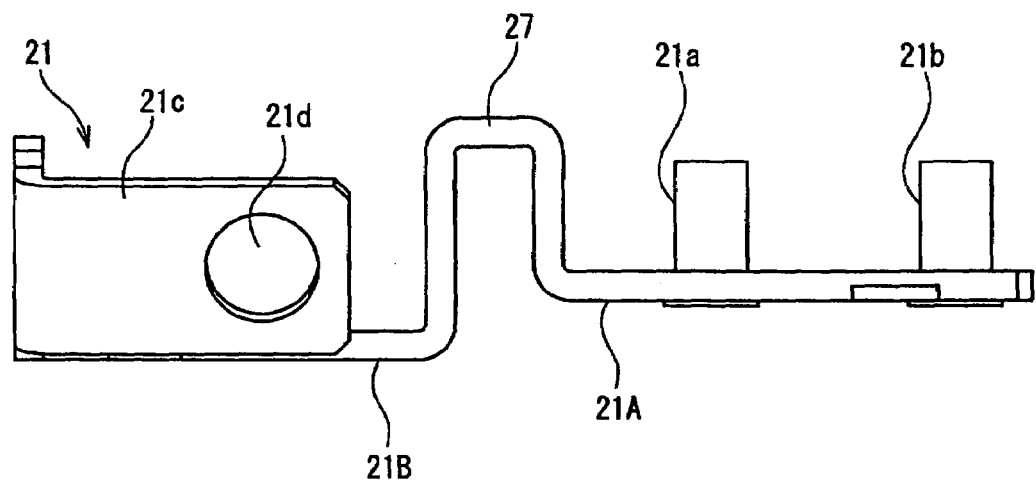
FIG. 5A is a side view showing an input-side bus bar.

As shown in FIGS. 2 and 5A, one end of the input-side bus bar opposite bolts 21a and 21b is bent to form a connection piece 21c that connects to a battery terminal 31. The battery terminal 31 may be crimped to an electric wire w1 connected, for example, to a starter and to an electric wire w0 connected, for example, to a relay box. The battery terminal 31 may have a circular arc portion 31a at a distal end thereof and a pair of tightening pieces 31b, 31c projected from the circular arc portion 31a. A bolt hole 21d communicating with a bolt hole (not shown) formed on the tightening pieces 31b, 31c is formed on the connection piece 21c of the input-side bus bar 21.

Figure 5B:
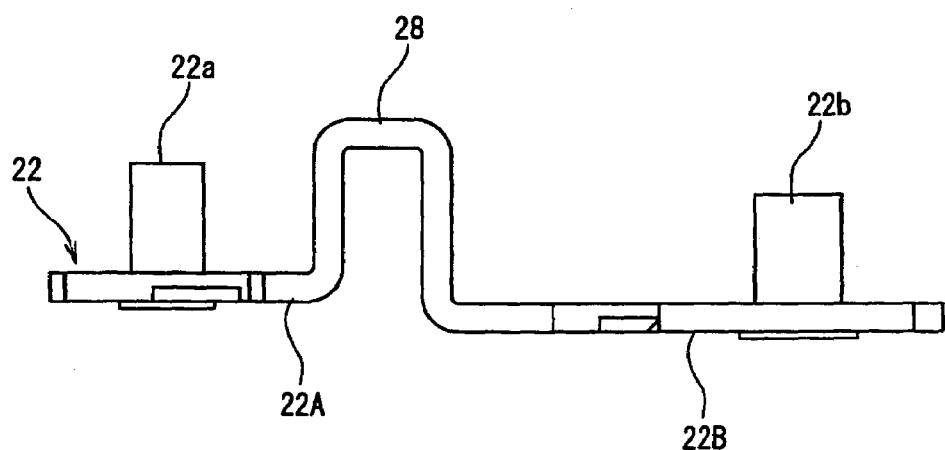
FIG. 5B is a side view showing an output-side bus bar.

As shown in FIG. 5B, a bolt 22b is projected from one end of the output-side bus bar 22. As shown in FIG. 2, the bolt 22b may be fitted in a perforated terminal 32 which may be crimped to an output electric wire w2 to fasten the perforated terminal 32 to the output-side bus bar 22 with the bolt 22b and the nut N. Similarly a bolt 23b may be projected from the other side of the output-side bus bar 23. The bolt 23b may be fitted in a perforated terminal 33 which may be crimped to an output electric wire w3 to fasten the perforated terminal 33 to the output-side bus bar 23 with the bolt 23b and the nut N.

As shown in FIG. 5A, the input-side bus bar 21 is upwardly bent at a position inward from the bolts 21a, 21b connected with the fusible links 25, 26, respectively, to form a watertight bent portion 27. A horizontal portion 21A of the input-side bus bar 21 is formed at the side of the fuse with respect to the watertight bent portion 27, with the horizontal portion 21A located at a higher position than a horizontal portion 21B of the input-side bus bar 21 disposed opposite to the side of the fuse. As shown in FIG. 1, the watertight bent portion 27 is shaped along a projected frame 11c formed upward from a bottom wall 11a of the case body 11.

As shown in FIG. 5B, the output-side bus bar 22 is upwardly bent at a position inward from the bolt 22a connected with the fusible link 25 to form a watertight bent portion 28. A horizontal portion 22A is formed at the side of the fuse with respect to the watertight bent portion 28, with the horizontal portion 22A located at a higher position than a horizontal portion 22B disposed opposite to the side of the fuse. The watertight bent portion 28 is shaped along the projected frame 11c formed upward from the bottom wall 11a of the case body 11.

Figure 6:
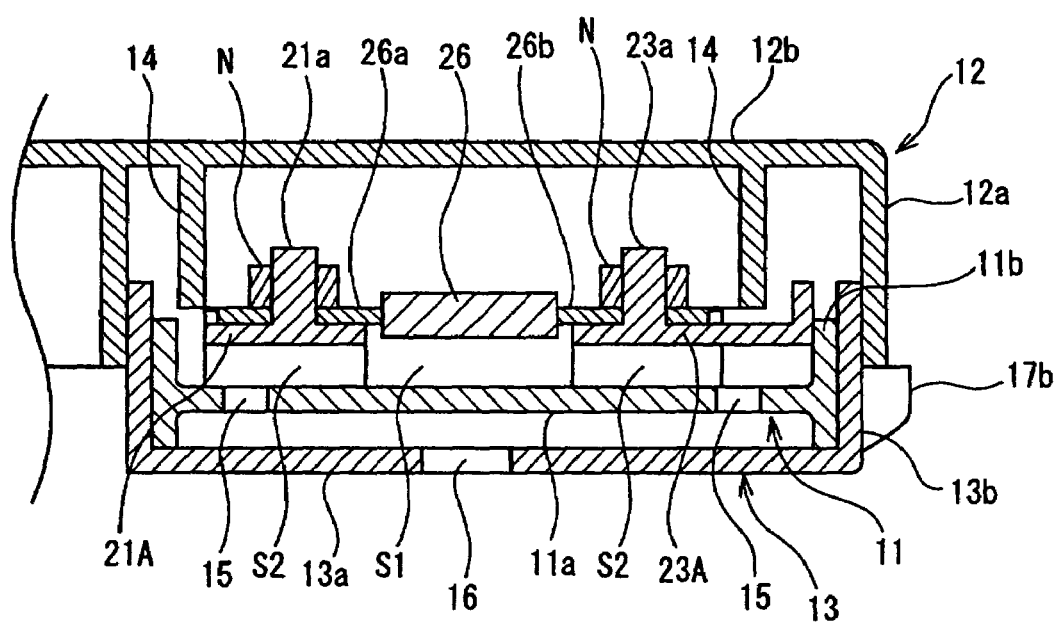
FIG. 6 is sectional view showing a state in which fusible links and bus bars of a case body shown in FIG. 2 are mounted.

As shown in FIG. 6, a horizontal portion 23A of the output-side bus bar 23 on which a bolt 23a connected with the fusible link 26 is formed is located on a level with the horizontal portion 21A of the input-side bus bar 21, with a space formed between the horizontal portions 23A, 21A and the bottom wall 11a of the case body 11.

Figure 3:
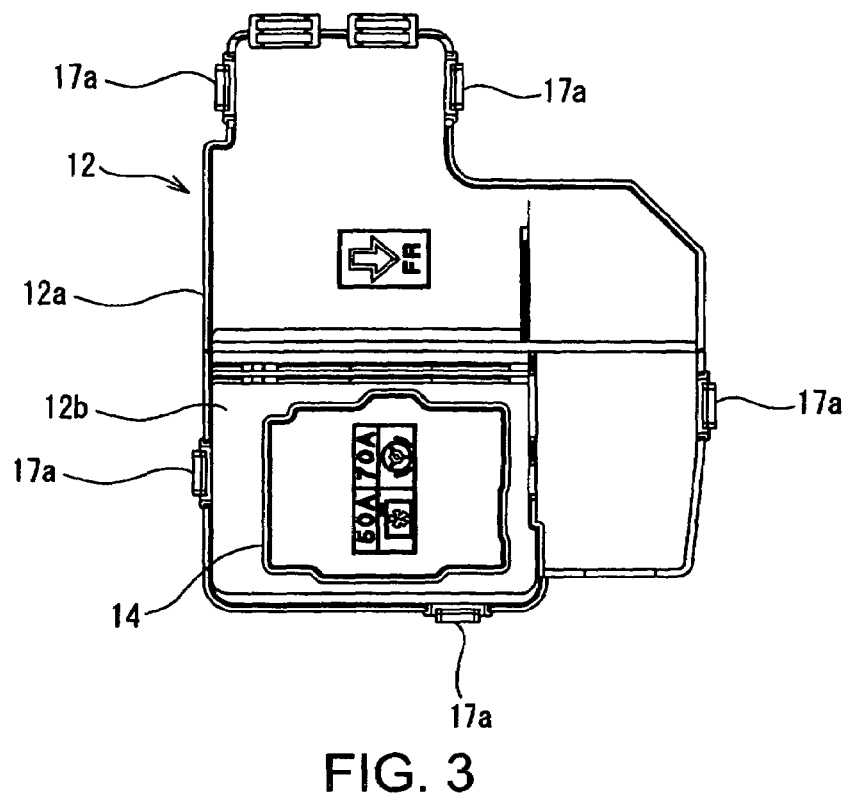
FIG. 3 is a plan view showing the inner side of an upper cover.

As shown in FIG. 3, in the upper cover 12, an entire peripheral wall 12a does not form a double wall construction. Instead, a frame-shaped rib 14, which surrounds the fusible links 25, 26, is projected from a position corresponding to the positions of the fusible links 25, 26 mounted on the case body 11. As shown in FIG. 1, the region surrounded with the rib 14 constitutes a watertight region X, whereas the region separated from the fusible links 25, 26 by the projected frame 11c projected from the bottom wall 11a of the case body 11 constitutes a nonwatertight region Y.

Figure 4:
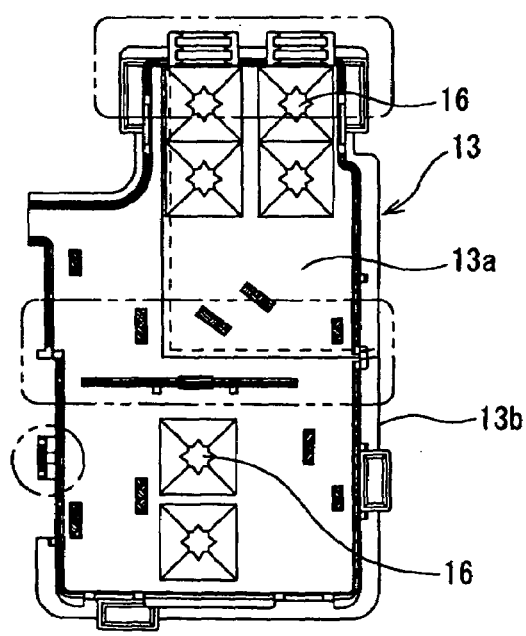
FIG. 4 is a plan view showing the inner side of a lower cover.

As shown in FIG. 6, a drain hole 15 is formed penetrating through the bottom wall 11a of the case body 11. More specifically, a plurality of drain holes 15 may be formed in the vicinity of outlets of the output electric wires w2, w3 and in the vicinity of the positions where the fusible links 25, 26 are connected to the bus bars 21, 22, 23. As shown in FIG. 4, in one embodiment of the invention, two drain holes 16 are formed, penetrating through a bottom wall 13a of the lower cover 13, at the fuse side with respect to the position of the watertight bent portions 27, 28, whereas four drain holes 16 are formed at the side opposite to the fuse side.

A method for attaching the electric junction box 10 having the above-described construction to the battery box 40 is described below.

Initially, the lower cover 13 may be placed on the lower surface of the case body 11. Thereafter as shown in FIG. 2, the case body 11 and the lower cover 13 may be connected to each other with a locking portion 18.

Thereafter, as shown in FIG. 2, the circular arc portion 31a of the battery terminal 31 may be fitted on the battery post 41 projected upward from the battery box 40. A bolt B is inserted into a bolt hole of each of the tightening pieces 31b, 31c and the bolt hole 21d of the connection piece 21 of the input-side bus bar 21, with the bolt holes superimposed on each other. Then the nut N is tightened to fixedly fit the circular arc portion 31a on the battery post 41 so that the battery and the fusible links 25, 26 are electrically connected with each other and the fuse box 10 is fixed to the upper surface of the battery box 40.

Finally, the upper cover 12 is placed on the upper surface of the case body 11. Thereafter the locking portion 17a of the upper cover 12 and the to-be-locked portion 17b of the lower cover 13 are locked to each other. At this time, the inner surface of the entire peripheral wall 12a of the upper cover 12 is in contact with the outer surface of the entire peripheral wall 13b of the lower cover 13.

In the electric junction box 10, the rib 14 surrounding the fusible links 25, 26 projects from the upper wall 12b of the upper cover 12. The fusible links 25, 26 are disposed in the watertight region X formed within a small range of the junction box.

Compared with the conventional construction in which the rib is formed along the entire peripheral wall 12a of the upper cover 12, the construction of the present invention decreases the space in which the rib 14 is formed, allows the space inside the electric junction box to be widely utilized for circuit wiring, and prevents the watertight performance of the rib 14 from being affected by the configuration of the electric junction box 10. Therefore the electric junction box 10 has an improved watertight performance. The rib 14 is disposed proximately to the fusible links 25, 26. Outside the rib 14, the bus bars 21, 22 are bent to form the watertight bent portions 27, 28 respectively. Therefore, it is possible to reduce penetration of water from the nonwatertight region Y, thereby enhancing the watertight performance of the watertight region X.

Because the electric junction box 10 is mounted on the battery box 40, only limited water should penetrate into the lower surface of the electric junction box 10 through the drain holes 15, 16. When water penetrates into the electric junction box 10 from connection portions where the upper cover 12, the case body 11, and the lower cover 13 are connected to each other, it drains the water through the drain holes 15, 16 formed penetrating through the bottom wall 11a of the case body 11 and the bottom wall 13a of the lower cover 13 respectively. As shown in FIG. 6, the fusible links 25, 26 in the watertight region X are mounted at high positions, with a space S1 formed between the fusible links 25, 26 and the bottom wall 11a of the case body 11 to restrict water from penetrating into the electric junction box 10. In addition, the horizontal portions 21A of the input-side bus bar 21 and the horizontal portions 22A and 23A of the output-side bus bars 22, 23 are disposed with a space S2 formed between the horizontal portions 21A, 22A, and 23A and the bottom wall 11a of the case body 11. This configuration makes it possible to efficiently and rapidly drain water from the watertight region.

FIG. 7 shows a first modification of the first embodiment.

In the first modification, a first small rib 12c and a second small rib 12d having different heights are projected from an inner surface of an upper wall 12b of the upper cover 12 toward an upper surface of the watertight bent portion 27.

A height H1 of the first small rib 12c formed in the watertight region X is set longer than a height H2 of the second small rib 12d formed in the nonwatertight region Y.

Convex portions 12c-1 and 12d-1 are projected from a lower surface of the first small rib 12c and that of the second small rib 12d respectively. A lower surface of the convex portion 12c-1 of the first small rib 12c is in close contact with the upper surface of the watertight bent portion 27. Because of the height of second small rib 12d is shorter than first small rib 12c, there is a slight gap formed between the convex portion 12d-1 of the second small rib 12d and the upper surface of the watertight bent portion 27.

Other constructions of the first modification is the same as those of the first embodiment. Thus the same parts of the first modification as those of the first embodiment are denoted by the same reference numerals as those of the first embodiment, and description thereof is omitted herein.

As described above, the first small rib 12c and the second small rib 12d, which have different heights, are projected from the inner surface of the upper wall of the upper cover 12 toward the upper surface of the projected watertight bent portion 27. The second small rib 12d disposed in the nonwatertight region Y helps prevent penetration of water into the watertight region. The first small rib 12c disposed in the watertight region X is capable of accomplishing complete watertightness.

Figure 8:
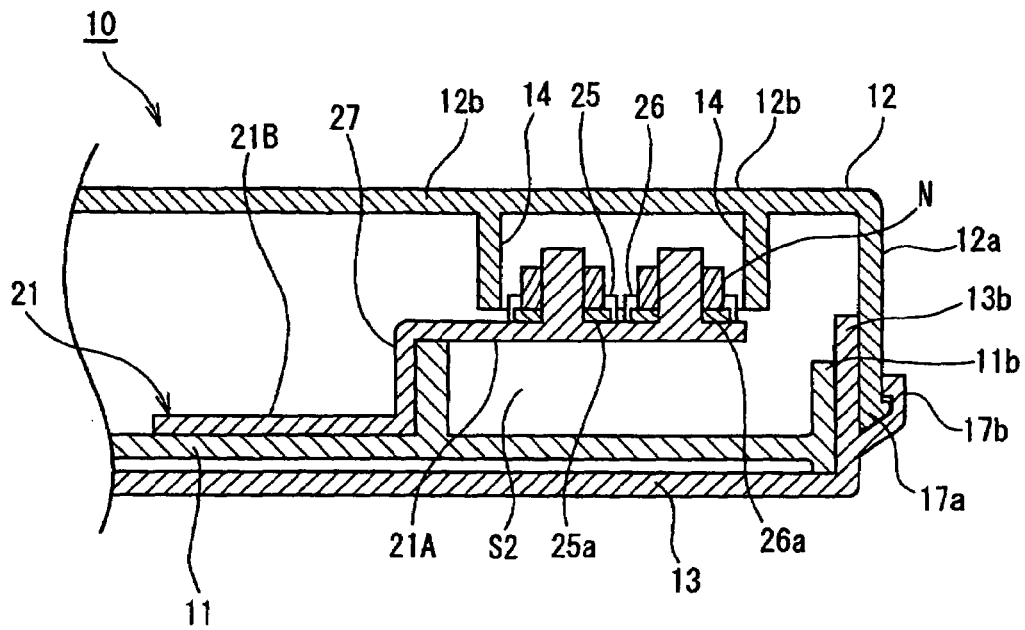
FIG. 8 shows a second modification of the first embodiment.

FIG. 8 shows a second modification the first embodiment. In the second modification, the bus bars 21 and 22 are bent to form the watertight bent portions 27 and 28, respectively, similar to the first embodiment. But unlike the first embodiment, portions of the bus bars 21, 22 disposed at the side of the fusible links are formed at positions not lower than the upper ends of the watertight bent portions 27, 28, but at positions on a level with the upper ends of the watertight bent portions 27, 28. That is, a portion of each of the watertight bent portions 27, 28 at the side of the fusible links 25, 26 is not bent downward but is extended horizontally.

The above-described construction provides a sufficiently large gap S2 between the case body 11 and the bus bars 21, 22 and reliably prevents the fusible links 25, 26 from becoming wet.

Figure 9:
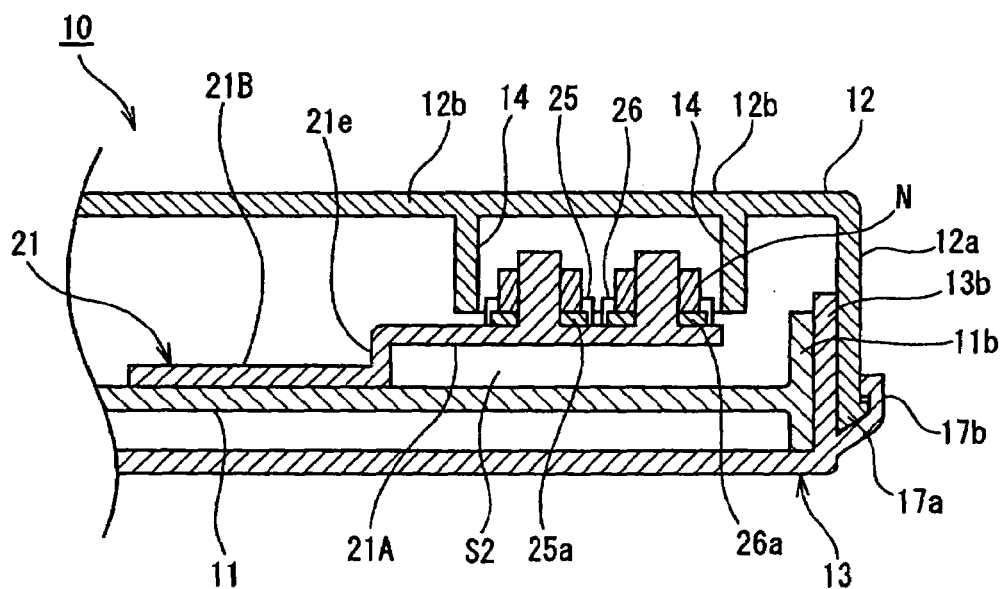
FIG. 9 is a sectional view showing an electric junction box according to a second embodiment of the present invention.
Figure 10:
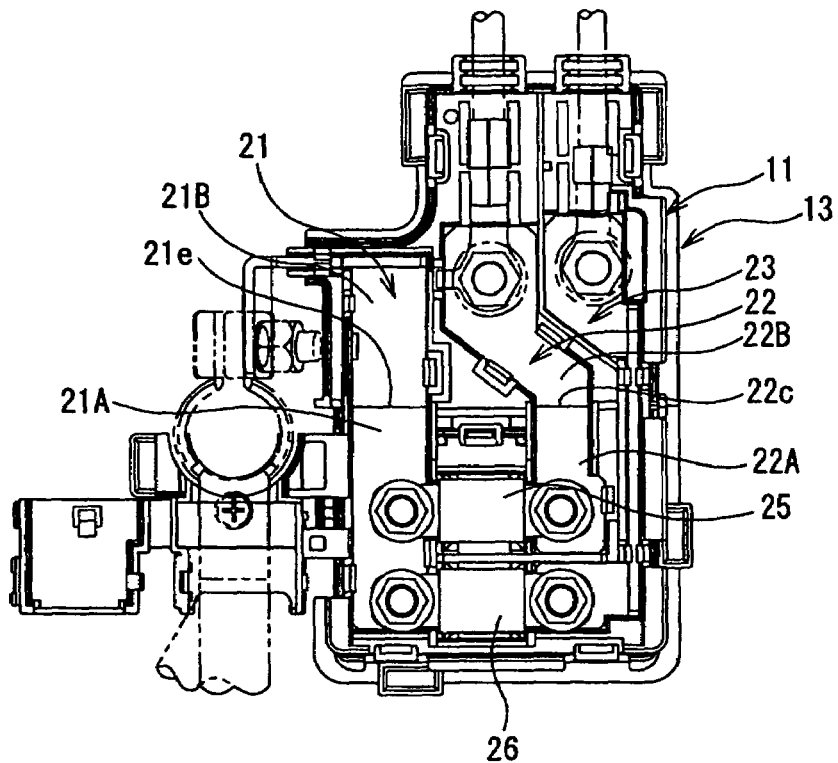
FIG. 10 is a plan view showing the inside of the electric junction box shown in FIG. 9.

FIGS. 9 and 10 show a second embodiment of the present invention.

The second embodiment is different from the first embodiment in that the watertight bent portions 27 and 28 are not formed by bending the input-side bus bar 21 and the output-side bus bar 23 respectively, but the watertight region is formed by the rib 14, formed on the upper cover 12, which surrounds the watertight region. Other constructions of the second embodiment are the same as those of the first embodiment. Thus the same parts of the second embodiment as those of the first embodiment are denoted by the same reference numerals as those of the first embodiment and description thereof is omitted herein.

More specifically, the watertight bent portions 27 and 28 are not formed by bending the input-side bus bar 21 and the output-side bus bar 23, respectively, but a part of the input-side bus bars 21, 22 is formed as stepped portions 21e and 22c, respectively, to locate each of fuse-side horizontal portions 21A and 22A at a position upward by the height of a gap S2 from the bottom wall 11a of the case body 11.

This construction eliminates the need for forming the space for the watertight bent portions 27 and 28 by bending the bus bars 21 and 23, thus allowing the space to be effectively utilized, saving space inside the electric junction box and allowing the electric junction box to be compact.

Figure 7A:
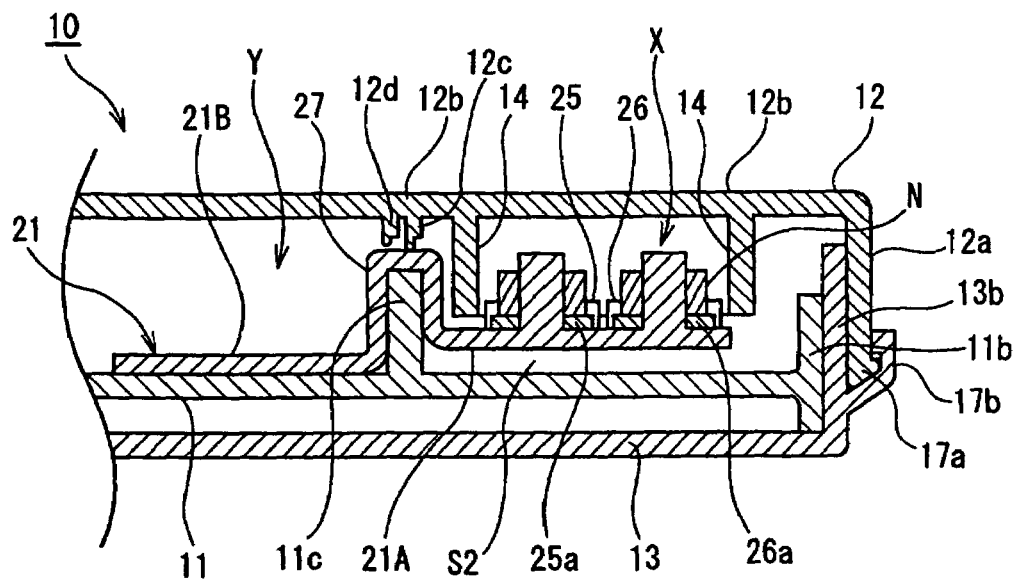
FIGS. 7A and 7B show a first modification of the first embodiment.
Figure 7B:
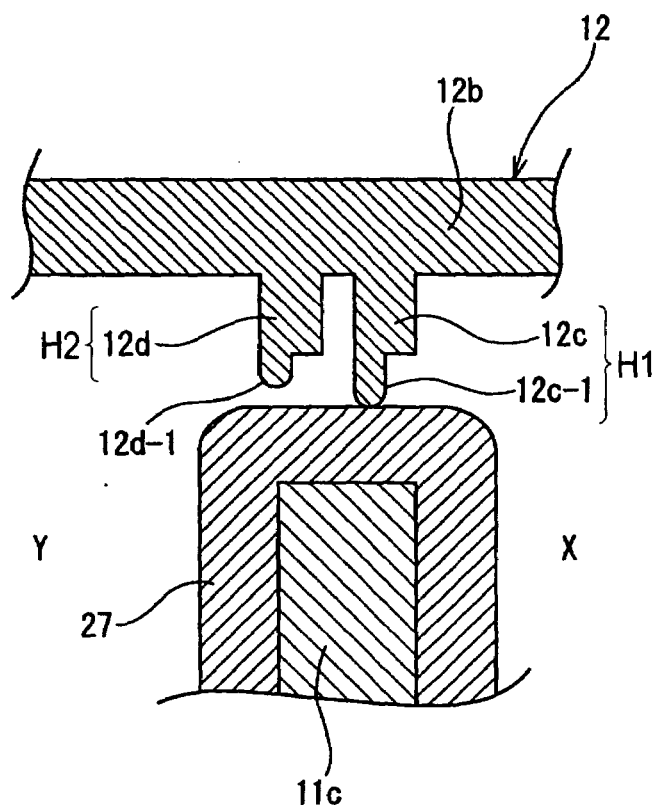
Figure 11:
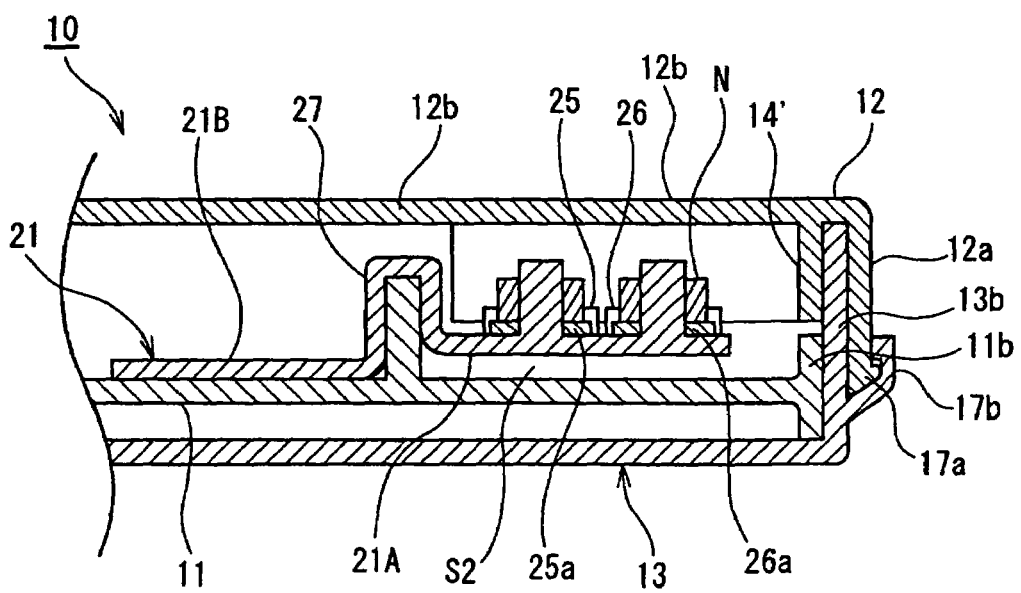
FIG. 11 is a sectional view showing an electric junction box according to a third embodiment of the present invention.
Figure 12:
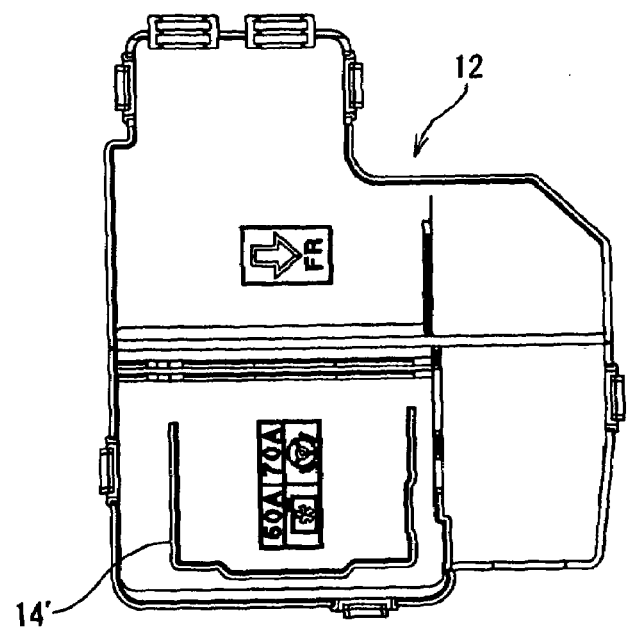
FIG. 12 is a plan view showing the inner side of an upper cover of the electric junction box shown in FIG. 11.
Figure 13:
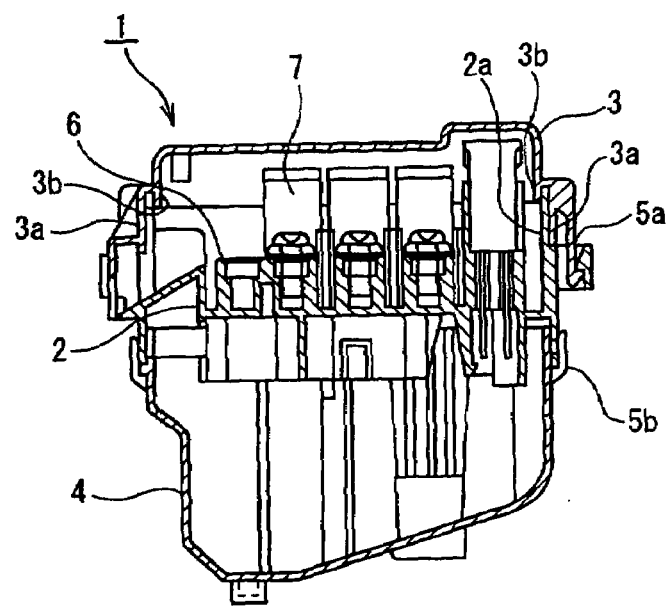
FIG. 13 shows a conventional electric junction box of the prior art.

FIGS. 11 and 12 show a third embodiment of the present invention. The modifications shown in FIGS. 7A and 7B are also applicable to the third embodiment. The third embodiment is different from the first embodiment in that, along the peripheral wall 12a of the upper cover 12, a U-shaped rib 14' is formed at a position confronting the peripheral wall 12a of the upper cover 12 to form a double wall. The rib 14' is not formed at a position, disposed inside the upper cover 12, which is distant from the peripheral wall 12a. Other constructions of the third embodiment are the same as those of the first embodiment. Thus the same parts of the third embodiment as those of the first embodiment are denoted by the same reference numerals as those of the first embodiment and description thereof is omitted herein.

In the third embodiment of the present invention, the peripheral wall 13b of the lower cover 13 is fitted between the peripheral wall 12a and the rib 14', thus forming the double wall by placing the upper cover 12 on the case body 11. Thereby a waterproof wall is constructed. In addition, the watertight bent portion 27 formed by bending the input-side bus bar 21 and the watertight bent portion 28 formed by bending the output-side bus bar 22 are disposed inside the watertight region not surrounded with the rib 14'. The watertight region is surrounded with the rib 14' and the watertight bent portions 27, 28. In this construction, four sides of the watertight region are waterproofed with the rib 14' and the watertight bent portions 27, 28. In addition, compared with the case in which the rib is formed in a rectangular frame, this construction eliminates the need for forming a space for one side of the rectangular frame. Thus this construction contributes to miniaturization of the electric junction box.

Although the invention has been described with reference to specific embodiments, those embodiments should be viewed as illustrative and not limiting. Various modifications, substitutions and improvements are possible within the spirit and scope of the invention.

What is claimed is:

1. An electric junction box that accommodates bus bars and at least one fuse connected with the bus bars, the electric junction box comprising:

a case body;

an upper cover and a lower cover connected with the case body, an entire peripheral wall of the upper cover being formed not as a double wall, the entire peripheral wall of the upper cover engaging a peripheral wall of the lower cover or a peripheral wall of the case body; and in a watertight region including at least the fuse, a rib being projected in a shape of a frame from an inner surface of a wall of the upper cover to surround the watertight region.

2. An electric junction box according to claim 1, wherein the bus bars connected with the fuse disposed in the watertight region surrounded with the rib are disposed in the case body; and a watertight bent portion which rides across the rib is formed in the bus bars.

3. An electric junction box according to claim 2, wherein:
the watertight bent portions of the bus bars are formed as convex portions projected toward an inner surface of an upper wall of the upper cover;
a double wall composed of a first small rib and a second small rib project from the inner surface of the upper wall of the upper cover toward upper surfaces of the projected watertight bent portions;
a height of the first small rib disposed in the watertight region is set longer than a height of the second small rib disposed in a nonwatertight region;
the first small rib contacts the upper surface of the watertight bent portion; and
a slight gap is formed between the second small rib and the upper surfaces of the watertight bent portions.

4. An electric junction box according to claim 3, said at least one fuse comprises a plurality of fuses wherein:
each of the fuses comprises a fusible link;
a region in which one of the fusible links or a plurality of the fusible links arranged adjacently is disposed is the watertight region; and
bus bars are connected with input terminals of the fusible links respectively and are connected with a battery terminal.

5. An electric junction box according to claim 4, a bolt is projected from a portion where the bus bars and the fusible links are connected with each other and is vertically spaced at a predetermined gap from a bottom wall of the case body;
the bolt is inserted into input and output terminals of the fusible links to fix the fusible links thereto with nuts;
the fusible links are spaced at a predetermined gap from the bottom wall of the case body; and a drain hole is formed in penetration through said bottom wall of said case body disposed below the fusible links.

6. An electric junction box according to claim 1, said at least one fuse comprises a plurality of fuses wherein:
each of the fuses comprises a fusible link;
a region in which one of the fusible links or a plurality of the fusible links arranged adjacently is disposed is the watertight region; and
bus bars are connected with input terminals of the fusible links respectively and are connected with a battery terminal.

7. An electric junction box according to claim 6, wherein:
a bolt is projected from a portion where the bus bars and the fusible links are connected with each other and is vertically spaced at a predetermined gap from a bottom wall of the case body;
the bolt is inserted into input and output terminals of the fusible links to fix the fusible links thereto with nuts;
the fusible links are spaced at a predetermined gap from the bottom wall of the case body; and a drain hole is formed in penetration through said bottom wall of said case body disposed below the fusible links.

8. An electric junction box according to claim 2, said at least one fuse comprises a plurality of fuses wherein:
each of the fuses comprises a fusible link;
a region in which one of the fusible links or a plurality of the fusible links arranged adjacently is disposed is the watertight region; and
bus bars are connected with input terminals of the fusible links respectively and are connected with a battery terminal.

9. An electric junction box according to claim 8, wherein:
a bolt is projected from a portion where the bus bars and the fusible links are connected with each other and is vertically spaced at a predetermined gap from a bottom wall of the case body;
the bolt is inserted into input and output terminals of the fusible links to fix the fusible links thereto with nuts;
the fusible links are spaced at a predetermined gap from the bottom wall of the case body; and a drain hole is formed in penetration through said bottom wall of said case body disposed below the fusible links.

10. An electric junction box that accommodates bus bars and at least one fuse connected with the bus bars inside a case body thereof, the case body being connected with an upper cover and a lower cover, with the upper cover and the lower cover mounted on the case body,
a rib projected from an inner surface of an upper wall of the upper cover, the rib being disposed in a watertight region including the fuse, the rib being disposed in proximity to and in confrontation with a peripheral wall of the upper cover;
a peripheral wall of the lower cover or a peripheral wall of the case body being fitted in a gap between the rib and the peripheral wall of the upper cover to form a waterproof wall;
inside a region of the upper cover in which the waterproof wall is not provided, watertight bent portions being formed by bent portions of the bus bars connected with the fuse, the watertight bent portions and the waterproof wall collectively surrounding the waterproof region.

11. An electric junction box according to claim 10, wherein:
the watertight bent portions of the bus bars are formed as convex portions projected toward an inner surface of an upper wall of the upper cover;
a double wall composed of a first small rib and a second small rib project from the inner surface of the upper wall of the upper cover toward upper surfaces of the projected watertight bent portions;
a height of the first small rib disposed in the watertight region is set longer than a height of the second small rib disposed in a nonwatertight region;
the first small rib contacts the upper surface of the watertight bent portion; and
a slight gap is formed between the second small rib and the upper surfaces of the watertight bent portions.

12. An electric junction box according to claim 11, said at least one fuse comprises a plurality of fuses wherein:
each of the fuses comprises a fusible link;
a region in which one of the fusible links or a plurality of the fusible links arranged adjacently is disposed is the watertight region; and
bus bars are connected with input terminals of the fusible links respectively and are connected with a battery terminal.

13. An electric junction box according to claim 12, a bolt is projected from a portion where the bus bars and the fusible links are connected with each other and is vertically spaced at a predetermined gap from a bottom wall of the case body;
the bolt is inserted into input and output terminals of the fusible links to fix the fusible links thereto with nuts;

the fusible links are spaced at a predetermined gap from the bottom wall of the case body; and a drain hole is formed in penetration through said bottom wall of said case body disposed below the fusible links.

14. An electric junction box according to claim 10, said at least one fuse comprises a plurality of fuses wherein:
- each of the fuses comprises a fusible link;
- a region in which one of the fusible links or a plurality of the fusible links arranged adjacently is disposed is the watertight region; and
- bus bars are connected with input terminals of the fusible links respectively and are connected with a battery terminal.

15. An electric junction box according to claim 14, a bolt is projected from a portion where the bus bars and the fusible links are connected with each other and is vertically spaced at a predetermined gap from a bottom wall of the case body;
- the bolt is inserted into input and output terminals of the fusible links to fix the fusible links thereto with nuts;
- the fusible links are spaced at a predetermined gap from the bottom wall of the case body; and a drain hole is formed in penetration through said bottom wall of said case body disposed below the fusible links.

* * * * *